Feb. 25, 1930.　　　　J. A. FIELDS　　　　1,748,758
DETACHABLE AND ADJUSTABLE HANDLE FOR CANS
Filed Jan. 7, 1929
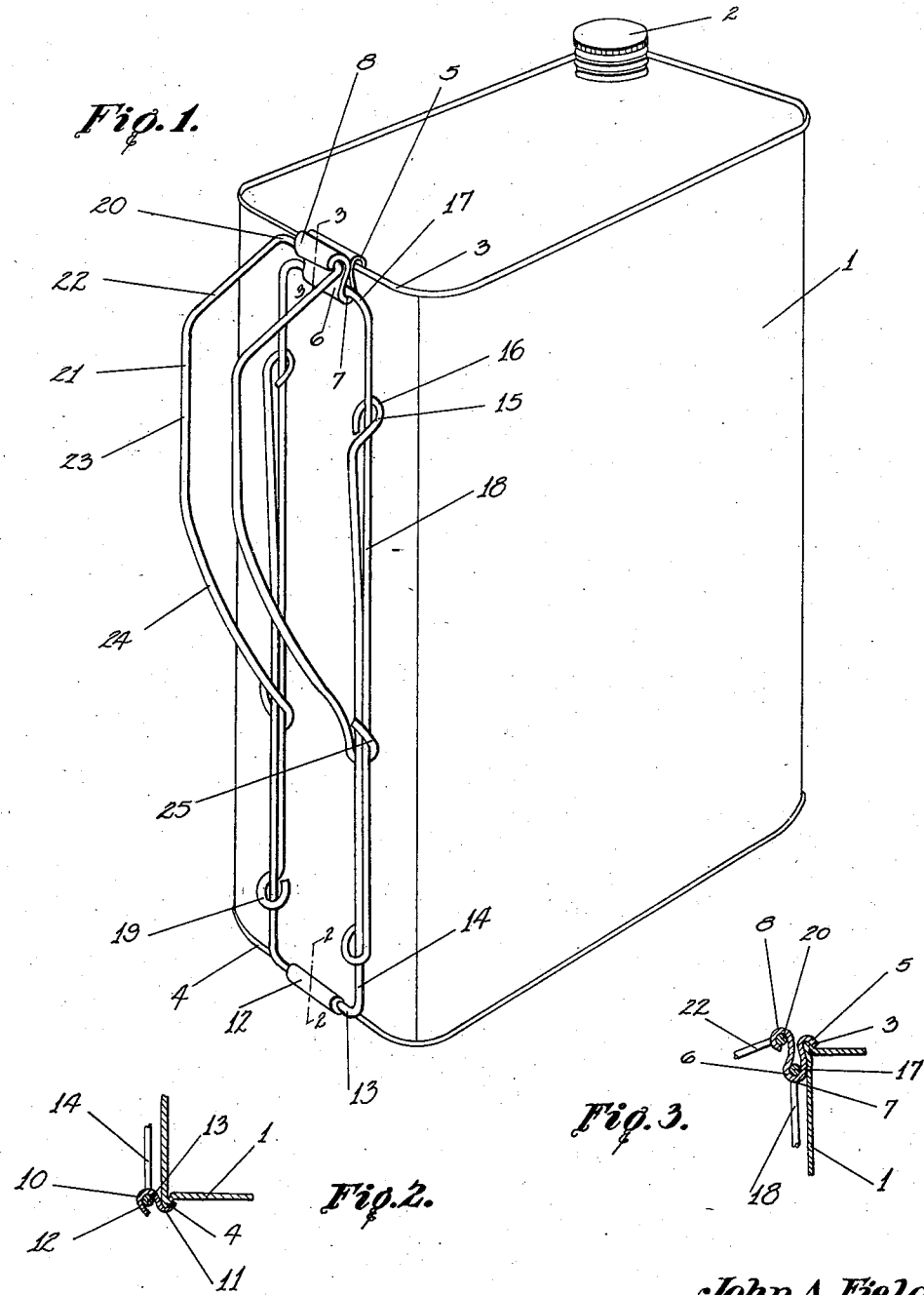
John A. Fields.
INVENTOR.
BY *Victor J. Evans*
ATTORNEY Patented Feb. 25, 1930

1,748,758

UNITED STATES PATENT OFFICE

JOHN A. FIELDS, OF SELDOVIA, TERRITORY OF ALASKA

DETACHABLE AND ADJUSTABLE HANDLE FOR CANS

Application filed January 7, 1929. Serial No. 330,818.

The object of this, my present invention is the provision of a removable and adjustable handle for cans or like containers whereby the said container can be easily moved to desired places and the contents thereof can be poured without the liability of the spilling thereof.

A still further object is the provision of a detachable and adjustable handle for cans or like containers that shall be of an extremely simple construction, cheaply manufactured, easily positioned upon the beaded top and bottom edges of the can or like container, and as readily removed therefrom when occasion requires.

To the attainment of the foregoing, the invention consists in the improvement as hereinafter described and definitely claimed.

In the drawings:

Figure 1 is a perspective view showing the application of my improvement.

Figure 2 is a detail transverse sectional view upon the line 2—2 of Figure 1.

Figure 3 is a similar sectional view approximately on the line 3—3 of Figure 1.

My improved detachable and adjustable handle is primarily designed for employment in connection with cans or like containers for lubricating oils and obviously the device may be successfully employed upon any other types of cans or containers.

Referring now to the drawings in detail, the numeral 1 designates an ordinary lubricant containing can which has its top or upper face, adjacent to one of its corners provided with the usual outlet which is normally closed by a screw cap 2.

The container 1 has both its upper and its lower edges formed with continuous outstanding beads 3 and 4, respectively. Designed to engage with the upper bead 3 on one side of the can 1 there is the U-shaped or hook-shaped end 5 of a metal clip 6. The clip preferably comprises a comparatively small strip of bendable metal and the same is centrally rounded upon itself, as at 7, and thence has both of its faces brought into contacting engagement and the outer face upon the extremity thereof has its outer edge rounded upon itself to provide what may be termed a barrel 8.

Designed to engage with the lower bead 4 there is a second clip 10. This clip has an inner upwardly directed hooked end 11 and an outer rounded portion 12. There is received through the rounded portion or barrel portion 12 the central or connecting portion 13 for the parallel arms 14 of a wire member. The arms 14 are of an equal length and have their ends extended at inward angles 15 (when the device is arranged upon the can) and the said ends merge into rounded portions or eyes 16. Passing through the rounded or looped portion 7 of the clip 6 there is the central portion 17 of a substantially U-shaped wire member. The parallel arms 18 of this wire member pass through the eyes 16 and have their extremities rounded to provide eyes 19 that receive therethrough the strands 14 of the first mentioned U-shaped wire members. The rolled portion or barrel 8 of the clip 6 affords a bearing for the straight upper end 20 of the handle 21 of the improvement.

The handle is also constructed from a single strand of wire and from its portion 20 the same is extended at outward angles, as at 22, and which merge into straight depending portions 23, the latter also merging into inwardly directed portions 24 that have their ends rounded and bent upon themselves to provide eyes 25 through which the parallel strands 14 and 18 are passed.

It will be apparent that the U-shaped members to which the clips are attached may be brought toward or away from each other so that the hooks on the said clips will be brought into proper and firm engagement with the beads 3 and 4 on the can. When the offset handle 23 is grasped the same will have a tendency to force the eyes 25 thereof against the lapping and angularly related strands 14 and 18 of the supporting wires, causing the same to be brought together and to bring their eyes 16 into frictional contact with the arms 18 and likewise force the eye portions 19 and the ends of the arms 18 into similar contact with the arms 14, whereby the can can be easily and safely conveyed from place to place and the can tilted so that the contents thereof may be delivered into the breather pipe of an automobile or to any other desired place.

The simplicity of the construction and the advantages thereof will, it is thought, be understood and appreciated by those skilled in the art to which such invention relates so that further detailed description will not be required, it being thought merely necessary to add that I do not wish to be restricted to the precise details herein set forth and, therefore, hold myself entitled to make such changes therefrom as fairly fall within the scope of what I claim.

It will be obvious that a grip upon the strands 23, will force the said strands toward each other and consequently tend to force the strands 18 and 14 toward each other. Thus it will be noted that when the device is gripped by the handle portions the clips 6 and 10 will have their edges 5 and 11 forced into greater frictional contact with the beads of the can 1, so that the said can can be handled without any liability of the improvement becoming disassociated therewith and likewise the said can may be canted to any desired angle to permit of the outflow of fluid therefrom. Of course, the frictional engagement between the eyes 16 and 19 with the longitudinal strands of the improvement will effectively hold the clips on the can even when the handle portions 23 are not gripped, but as previously stated, a longitudinal movement in a direction away from each other of the parts constituting the improvement will allow the same to be readily arranged on the can and a reverse longitudinal movement will permit of the device being easily and quickly connected to the can.

Having described the invention, I claim:

1. The combination with a closed can or like receptacle having a normally closed outlet, of a removable and adjustable handle for said can or receptacle comprising clips having oppositely hooked portions to engage with the upper and lower edges of the can, U-shaped members swingably connected with each of the hooks, and having eye portions on the ends thereof through which the arms of the respective members pass, an angularly disposed handle also comprising a substantially U-shaped wire member swingably connected with the upper clip and having its arms provided with eyes through which the respective pairs of arms of the first mentioned U-shaped members pass.

2. A removable and adjustable handle for oil cans or like containers which have their upper and lower edges beaded and which likewise have their tops provided with normally closed openings, said handle comprising an upper metal clip having a hooked edge to engage with the upper bead of the can and having its body centrally rounded upon itself, a U-shaped member having its central portion finding a bearing in said rounded portion of the clip and the outer face of the clip at the upper edge thereof being rounded upon itself to provide a barrel, an offset handle which is U-shaped in plan having its connected portion journaled in the barrel, a second clip having an upwardly directed hook to engage the lower bead of the can, and an outer rounded portion, a second substantially U-shaped wire journaled through the rounded portion and having its arms offset with respect to the arms of the first mentioned U-shaped member, each of said U-shaped members having their arms at the ends thereof formed with eyes to receive the arms of the cooperating U-shaped members therethrough and the handle having its ends provided with eyes through which the respective pairs of arms of the U-shaped members are received.

In testimony whereof I affix my signature.

JOHN A. FIELDS.